(12) United States Patent
Zhou

(10) Patent No.: US 9,386,409 B2
(45) Date of Patent: Jul. 5, 2016

(54) LBS-BASED PROMPT INFORMATION OUTPUT METHOD AND SYSTEM, AND STORAGE MEDIUM

(71) Applicant: Tencent Technology (Shenzhen) Company Limited, Shenzhen (CN)

(72) Inventor: Kang Zhou, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 85 days.

(21) Appl. No.: 14/267,433

(22) Filed: May 1, 2014

(65) Prior Publication Data

US 2014/0243023 A1    Aug. 28, 2014

Related U.S. Application Data

(63) Continuation of application No. PCT/CN2013/072896, filed on Mar. 19, 2013.

(30) Foreign Application Priority Data

Apr. 11, 2012    (CN) .......................... 2012 1 0104502

(51) Int. Cl.
*H04W 4/02*    (2009.01)

(52) U.S. Cl.
CPC .............. *H04W 4/02* (2013.01); *H04W 4/023* (2013.01)

(58) Field of Classification Search
CPC ................................ H04W 4/02; H04W 4/023
See application file for complete search history.

(56) References Cited

U.S. PATENT DOCUMENTS

| 2005/0080555 | A1 | 4/2005 | Parupudi et al. |
| 2007/0005363 | A1 | 1/2007 | Cucerzan et al. |
| 2007/0298757 | A1* | 12/2007 | Ahn ............... G08B 27/006 455/404.1 |
| 2008/0126334 | A1 | 5/2008 | Laine et al. |
| 2013/0281129 | A1 | 10/2013 | Laine et al. |

FOREIGN PATENT DOCUMENTS

| CN | 1617621 | A | 5/2005 |
| CN | 1617621 | A | 5/2005 |
| CN | 101208613 | A | 6/2008 |
| CN | 101536467 | A | 9/2009 |

OTHER PUBLICATIONS

International Search Report for the corresponding PCT Application No. PCT/CN2013/072896, dated Jun. 20, 2013, 4 p.

(Continued)

*Primary Examiner* — Chuong A Ngo
(74) *Attorney, Agent, or Firm* — Brinks Gilson & Lione

(57) ABSTRACT

An LBS-based prompt information output method and system, and a storage medium according to the present disclosure, comprising: acquiring current time and/or a current geographic location, determining whether the current time falls within a preset time range, and/or determining whether a distance value between the current geographic location and a preset specified geographic location is smaller than or equal to a preset distance value; when a determination result is positive, outputting preset prompt information. The present invention is capable of enabling a user to acquire service information concerning the user and relating to the specified geographic location in time.

18 Claims, 4 Drawing Sheets

(56) References Cited

OTHER PUBLICATIONS

International Preliminary Report on Patentability and Translation of the Written Opinion of the International Searching Authority for the corresponding PCT Application No. PCT/CN2013/072896, dated Oct. 14, 2014, 8p.

Office Action for Corresponding Chinese Application No. 201210104502.X; mailed Aug. 27, 2015, 8 pages.

Written Opinion issued by the Singaporean Patent Office for corresponding Singaporean Application No. 11201401702T; mailed Jul. 9, 2015, 8 pages.

Office Action dated Mar. 2, 2016 for corresponding Chinese Patent Application No. 201210104502.X, 7 pages.

\* cited by examiner

LBS-BASED PROMPT INFORMATION OUTPUT METHOD AND SYSTEM, AND STORAGE MEDIUM

RELATED APPLICATIONS

This application is a continuation of International Application No. PCT/CN2013/072896, filed Mar. 19, 2013, entitled LBS-BASED PROMPT INFORMATION OUTPUT METHOD AND SYSTEM, AND STORAGE MEDIUM, which claims priority to Chinese Application No. CN 201210104502.X filed Apr. 11, 2012, entitled LBS-BASED PROMPT INFORMATION OUTPUT METHOD AND SYSTEM, AND STORAGE MEDIUM, both of which are hereby being fully incorporated by reference.

TECHNICAL FIELD

The disclosure generally relates to technology field of information pushing. In particular, the disclosure relates to a method and a system for outputting prompt information based on LBS, and storage medium.

BACKGROUND

Various events in our daily life and work have no intimate connection with time, but they are closely related to their locations, that is LBS (Location Based Services). LBS has two meanings: the first is the determination of the geographic location of the mobile device or user, and the second is to provide location-related service. For example, there is a friend you have not seen for a long time and you are always thinking of making a call or dropping by when passing his house but it is delayed for various reasons; you always forget your monthly payment for network until the last day or sometimes you even completely forget about it, even if you often pass by the payment business office during that period; you want to go somewhere by bus in the afternoon and you have to get off at some bus station, but you miss your stop because you are not familiar with the bus route and there is no broadcasting of station names on the bus; etc. However, the prior art hasn't achieved the goal of pushing the service information related to a certain geographic location to a user in a timely manner so that the user can't acquire the service information related to the geographic location in time.

SUMMARY OF THE DISCLOSURE

The disclosure is to provide a method and system for outputting prompt information based on LBS for solving the problem that the service information related to a certain geographic location and concerned by a user can not be output in time, so that the user cannot acquire the service information related to the geographic location in time and the user experience is poor.

The embodiments of the disclosure provide a method of outputting prompt information based on LBS, the method includes the steps of: acquiring current time and/or a current geographic location; determining whether the current time falls within a preset time range; and/or determining whether a value of distance between the current geographic location and a preset specified geographic location is less than or equal to a preset distance value, outputting a preset prompt information when the current time falls within the preset time range, or when the value of distance between the current geographic location and a preset specified geographic location is less than or equal to a preset distance value, or when the current time falls within the preset time range and the value of distance between the current geographic location and a preset specified geographic location is less than or equal to a preset distance value, the prompt information includes service information related to the specified geographic location.

The embodiments of the disclosure further provide a system for outputting prompt information based on LBS, the system includes: a current time and location acquiring unit configured to acquire current time and/or a current geographic location; a determining unit configured to determine whether the current time falls within a preset time range, and/or determine whether a value of distance between the current geographic location and a preset specified geographic location is less than or equal to a preset distance value; a prompt output unit configured to output a preset prompt information when the determining unit determines that the current time falls within a preset time range, or the value of distance between the current geographic location and a preset specified geographic location is less than or equal to a preset distance value, or the current time falls within a preset time range and a value of distance between the current geographic location and a preset specified geographic location is less than or equal to a preset distance value, the prompt information includes service information related to the specified geographic location.

The embodiments of the disclosure further provide a non-transitory storage medium which stores therein a set of processor-executable instructions which, when processed by the processor, cause the processor to complete the following steps: acquiring current time and/or a current geographic location; determining whether the current time falls within a preset time range, and/or determining whether a value of distance between the current geographic location and a preset specified geographic location is less than or equal to a preset distance value; outputting a preset prompt information when the current time falls within the preset time range, or when the value of distance between the current geographic location and a preset specified geographic location is less than or equal to a preset distance value, or when the current time falls within the preset time range and the value of distance between the current geographic location and a preset specified geographic location is less than or equal to a preset distance value, the prompt information includes service information related to the specified geographic location.

The embodiments of the disclosure solve the problem that the user can't acquire the service information related to the geographic location in time and the user experience is poor by acquiring current time and/or a current geographic location, determining whether the current time falls within a preset time range, and/or determining whether a value of distance between the current geographic location and a preset specified geographic location is not greater than a preset distance value, and outputting a preset prompt information including service information related to the specified geographic location to devices such as mobile terminal when a result of determination is "positive", therefore greatly improve the timeliness and effectiveness of acquiring the service information concerned by user and related to a certain geographic location and thus improve the user experience.

DETAILED DESCRIPTION OF THE DISCLOSURE

For the clarity of the technical proposal and the advantages of the disclosure, further details of the disclosure will be described referring to the attached figures. It should be noted that the specific embodiments described here are only exemplary, not limiting the disclosure.

The embodiments of the disclosure enable the user or other users specified by the user to acquire the service information related to a certain geographic location timely and effectively by acquiring current time and/or a current geographic location, determining whether the current time falls within a preset time range, and/or determining whether a value of distance between the current geographic location and a preset specified geographic location is not greater than a preset distance value, and outputting a preset prompt information including service information related to the specified geographic location when a result of determination is "positive", therefore the user experience is good.

The following will describe the specific implementations of the disclosure with regard to the specific embodiments in detail.

Currently, many map software provides map service which provides inquiry service for clients mainly through graphics or text interface, and it can be acquired from major cities across the country. User can know current position situations in major cities across the country at any time through the map and acquire the route map, traffic condition, route selection and location information of POI (Point Of Interest) to the destination. The traditional positioning technology acquires the location information such as longitude and latitude mainly through the positioning device of the mobile terminal, which mainly uses the positioning devices of GPS (Global Position System), Beidou navigation system, GLONASS (Global Navigation Satellite System) and GALILEO Civilian global satellite positioning system. With the development of positioning technology in recent years, base station positioning and WIFI positioning are emerging.

Figure 1:
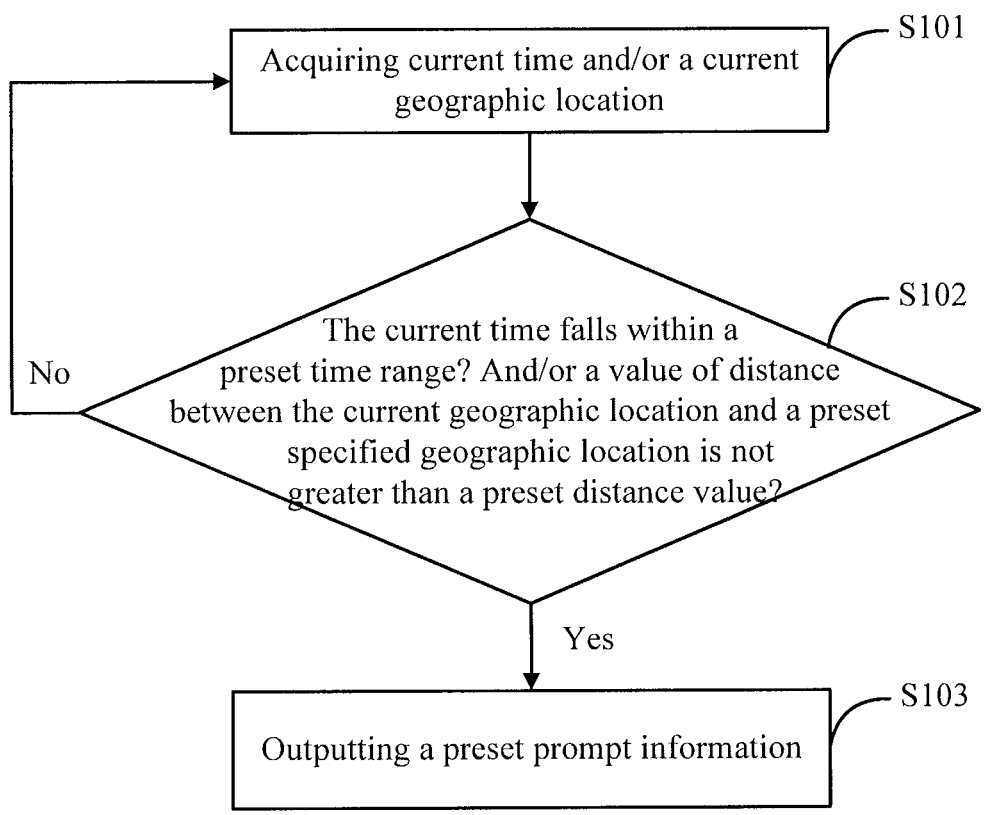
FIG. 1 is a flow chart illustrating the method of outputting prompt information based on LBS according to the first embodiment of the disclosure.

FIG. 1 illustrates the flow chart of the prompt information output method based on LBS according to the first embodiment of the disclosure, the details are as follows.

In Step S101, the current time and/or the current geographic location are acquired.

In this Step S101, the step of acquiring the current geographic location specifically includes: acquiring multiple location information corresponding to the current geographic location using multiple positioning system, acquiring the location information of the current geographic location by making weighted summation of the multiple location information according to the preset weights of each positioning system, and determining the current geographic location according to the location information.

Figure 2:
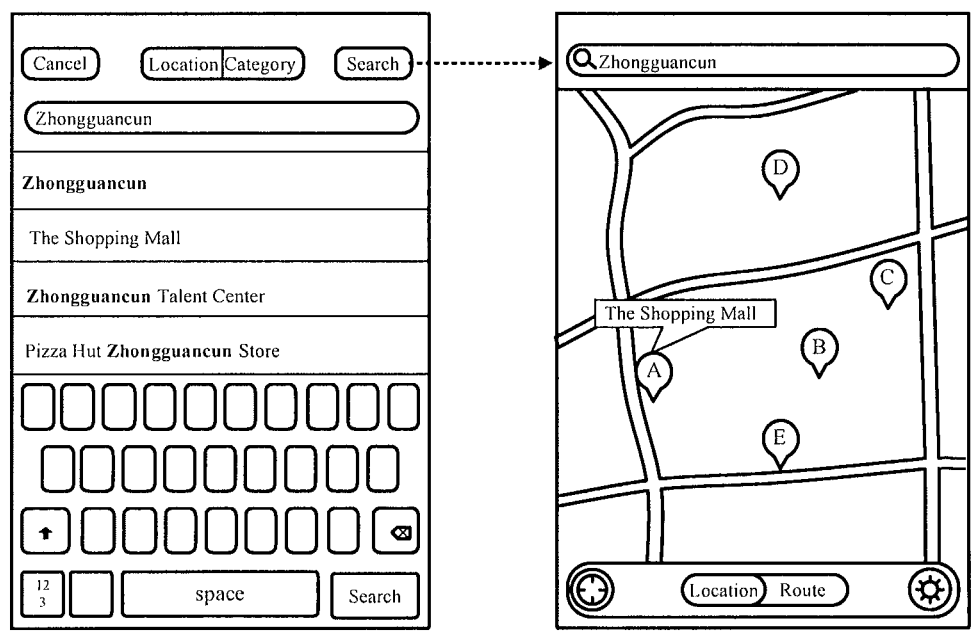
FIG. 2 illustrates a process of acquiring the current geographic location through traditional map software according to the embodiment of the disclosure.

In the specific implementation process, current geographic location and current time of the user or mobile terminal need to be determined firstly. The way of acquiring the current time is relatively simple. The current time may be directly acquired from the current output time displayed on the terminal or from the user's own watch. Also, the current geographic location may be generally acquired by inquiring POI through traditional map software (e.g. Mobile SOSO Map, etc.) or by the positioning device. FIG. 2 is a schematic diagram illustrating a process of acquiring the current geographic location through traditional map software.

However, in the embodiment of the disclosure, multiple location information of a certain geographic location can be acquired by using multiple currently existing positioning technologies. The location information includes latitude and longitude information, etc. More accurate location information can be acquired by processing the multiple location information, and the more accurate location information is further be utilized to determine the certain geographic location. It should be noted that the current geographic location may be sent to the connected server side after being acquired by the client side, and it can also be acquired at the client side or server side using its own geographic location system. Specifically, among several positioning systems capable of acquiring the location information of the current geographic location, it can (but is not limited to preferably) use GPS positioning to acquire the first location information L1, (next) use WIFI positioning to acquire the second location information L2, and (finally) use CELL-ID positioning to acquire the third location information L3. Finally, there are three location information acquired by using three positioning systems. According to the preset first positioning weight w1 corresponding to the GPS positioning system, the second positioning weight w2 corresponding to the WIFI positioning system, and the third positioning weight w3 corresponding to the CELL-ID positioning system, wherein, $w1+w2+w3=1$, the location information of the current geographic location may be acquired as $LL=(w1*L1+w2*L2+w3*L3)$, LL may be the latitude and longitude information of the current geographic location. Therefore, the current geographic location may be determined using this LL. It should be noted that, choosing multiple positioning systems and setting the corresponding weights may be configured according to one or more parameters such as the environment around the current geographic location, theoretical positioning accuracy and positioning time-consuming. The accuracy of the positioning result is finally assured.

In the embodiment of the disclosure, before performing the step S102, the prompt information output method based on LBS further comprises: determining a specified geographic location, setting the preset time range and/or the preset distance value corresponding to the specified geographic location, while setting the prompt information corresponding to the specified geographic location. Wherein, the prompt information includes service information related to the specified geographic location, and the preset distance value is space radius around the specified geographic location.

Figure 3:
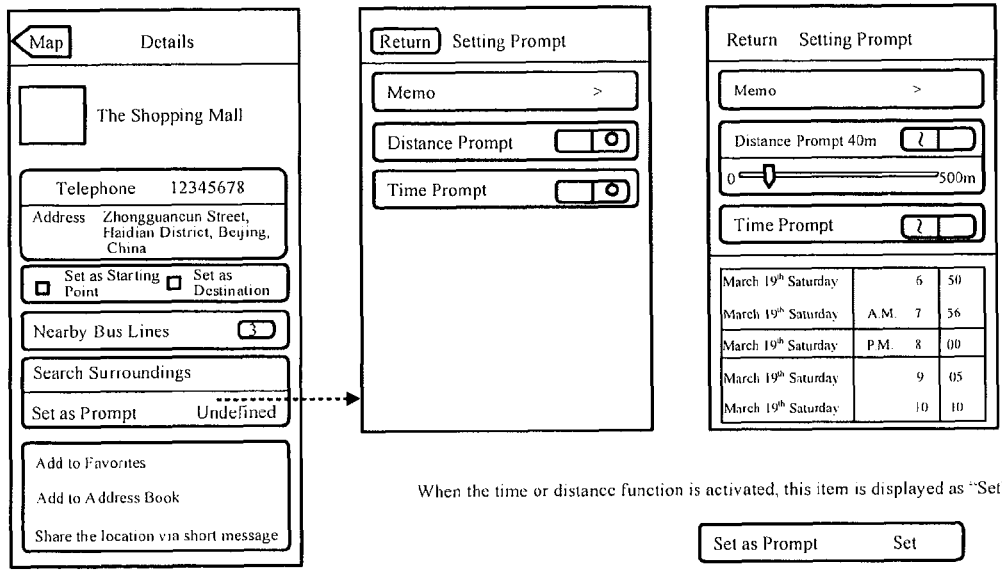
FIG. 3 is a schematic diagram illustrating the prompt information setting according to the embodiment of the disclosure.

In the embodiment of the disclosure, when the user needs to acquire the service information around a certain geographic location, for example, market's promotion activity, bus station information, medical service information, etc. in order to prevent the user from missing the service information and so on, the service information around the certain geographic location may be defined as the prompt information, and of course any information customized by the user may also be defined as prompt information, so that the user may acquire more service information when the user is near the geographic location or when a certain time arrives. Particularly, a certain specified geographic location concerned by the user needs to be determined firstly. This specified geographic location may be acquired according to the latitude and longitude information preset by the user. The preset time range corresponding to the specified geographic location may then be defined, as shown in FIG. 3, the preset time range may be defined as 7:55 AM, SAT, March 19 to 8:00 AM, SAT, March 19, so that when the current time falls within this preset time range, that is, when the preset condition is met, the preset prompt information is pushed. Or a space radius around the specified geographic location, such as 40 m, may be simultaneously or separately defined so that when the value of distance between the current geographic location and the specified geographic location is less than or equal to the preset 40 m, the preset prompt information is pushed. And the preset prompt information may for example be "the nearby bus route is line 3" as shown in FIG. 3, and it may display the market information nearby, such as the address and telephone of a shopping mall.

In the step S102, it is determined whether the current time falls within a preset time range, and/or whether the distance between the current geographic location and a preset specified geographic location is less than or equal to (that is, not greater than) a preset distance value.

In the step S103, the preset prompt information is output when a result of determination is "positive", otherwise the preset prompt information is not output and the method returns to perform step S101, wherein the prompt information includes service information related to the specified geographic location.

Particularly, the preset distance value is the space radius around the specified geographic location, and the step S102 includes the following three cases.

For example, after setting the time range and acquiring the current time, the method can determine whether the current time falls within the preset time range by step S102. If the determination is "positive", then the preset prompt information is output, otherwise the preset prompt information is not output and the method continues to acquire the current time in real time.

For example, after setting the space radius and acquiring the current geographic location, the method can determine whether the distance between the current geographic location and the preset specified geographic location is not greater than the preset space radius by step S102. If the determination is "positive", then the preset prompt information is output, otherwise the preset prompt information is not output, and the method returns to the step S101 to keep acquiring the current geographic location in real time.

For another example, after setting the time range and the space radius, and acquiring the current time and geographic location, the method may determine whether the current time falls within the preset time range and whether the distance between the current geographic location and the preset specified geographic location is not greater than the preset space radius by step S102. If the determination is "positive", then the preset prompt information is output, otherwise the preset prompt information is not output, and the method continues to acquire the current time and the current geographic location in real time.

Further, when the results of determination are "positive", besides the preset prompt information is sent to the user's own client side, this prompt information may also be sent to the user's friends' client sides via Instant Messaging (IM) such as short message and QQ message to enlarge the number of people receiving the prompt information. Moreover, the method may be set to quit outputting the prompt information only when the user turns off the "prompt" function, otherwise the method may be set to keep outputting the preset prompt information as long as the determination condition is met, that is, to keep acquiring the current time and/or current geographic location information and the determination keeps meeting the conditions. It may be actually set according to the user's needs.

In the specific implementation process, an error value may be defined when a distance value between the current geographic location and the preset specified geographic location is acquired. The absolute value of a difference between the distance value and the error value is acquired. When the determination of whether the absolute value is not greater than a preset distance value is "positive", the preset prompt information is output. With this method, the errors existing in acquiring the current geographic location may be avoided and the accuracy of the determination result may be assured.

In the embodiment of the disclosure, when the information prompt function based on LBS is activated, pushing information concerned by the user according to time and/or location distance information is achieved, by determining that the current time falls within a preset time range, and/or that the distance between the current geographic location and a preset specified geographic location is less than or equal to a preset distance value, and outputting a preset prompt information including service information related to the specified geographic location, so that the user may acquire the service information related to the certain geographic location timely and effectively and the user experience is improved. Moreover, the embodiment of the disclosure may accurately acquire the current geographic information by means of weighted summing multiple positioning systems, thus further improve the accuracy of the information prompting and enlarge the service information coverage of the service information providers and merchants from another aspect.

Those skilled in the art should understand that the implementations of all or part of the steps in the methods of the above embodiments may be accomplished through relevant hardware instructed by a program. The program may be stored in computer readable storage medium such as ROM/RAM, magnetic disk and optical disk.

Figure 4:
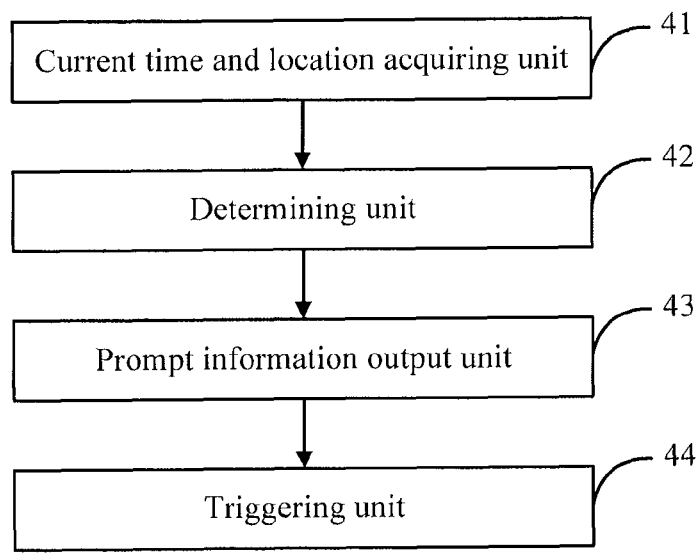
FIG. 4 is a structural diagram illustrating the system for outputting prompt information based on LBS according to the second embodiment of the disclosure.

FIG. 4 is a diagram illustrating the prompt information output system based on LBS according to the second embodiment of the disclosure. For illustration, only the parts related to the embodiment of the disclosure are shown.

The prompt information output system based on LBS may be used in a server in which the prompt information is output to be displayed on the client side through interactive communication between the client side and the server side, and in a mobile terminal with a positioning function such as cell phone. The prompt information output system based on LBS may as well as be a software unit running on these mobile terminals, or be integrated into these mobile terminals as independent components. The prompt information output system based on LBS comprises a current time and location acquiring unit 41, a determining unit 42, a prompt output unit 43 and a trigger unit 44. The current time and location acquiring unit 41 is configured to acquire the current time and/or the current geographic location.

Figure 5:
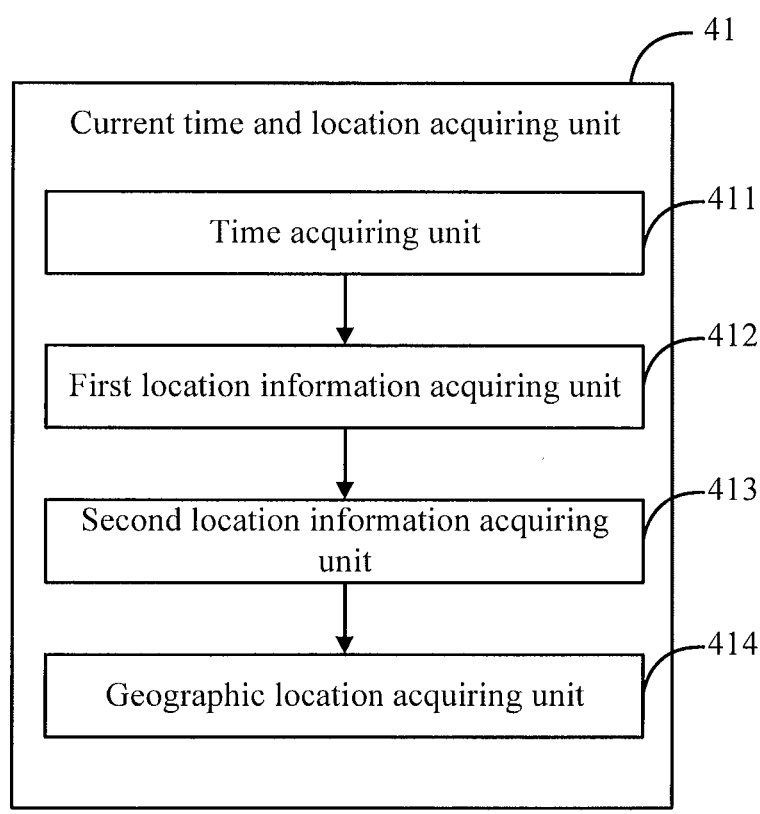
FIG. 5 is a specific structural diagram illustrating the current time and location acquiring unit according to the second embodiment of the disclosure.

As shown in FIG. 5, the current time and location acquiring unit 41 specifically comprises: a time acquiring unit 411 configured to acquire the current time; a first location information acquiring unit 412 configured to acquire multiple location information corresponding to the current geographic location by using multiple positioning systems; a second location information acquiring unit 413 configured to acquire the location information of the current geographic location by making weighted summation of the multiple location information according to the preset weights of each positioning system; and a geographic location acquiring unit 414 configured to determine the current geographic location according to the location information.

In the embodiment of the disclosure, the way of acquiring the current time by using the current time acquiring unit 411 is relatively simple. The current time may be directly acquired from the current output time displayed on the terminal or from the user's own watch. And the current geographic location may be acquired by using the first location information acquiring unit 412, the second location information acquiring unit 413 and the geographic location acquiring unit 414. For example, the multiple positioning systems are GPS and WIFI positioning systems. The first location information acquiring unit 412 may acquire the first location information L1 using GPS positioning system and acquire the second location information L2 using WIFI positioning system. According to the preset first positioning weight w1 corresponding to the GPS positioning system and the second positioning weight w2 corresponding to the WIFI positioning system, the location information of the current geographic location may be acquired as LL=(w1*L1+w2*L2) using the second location information acquiring unit 413. LL may be the latitude and longitude information of the current geographic location. And therefore the current geographic location may be determined by using this LL. It should be noted that, choosing multiple positioning systems and setting the corresponding weights may be configured according to one or more parameters such as the environment around the current geographic location, theoretical positioning accuracy and positioning time-consuming. The accuracy of the positioning result may be improved.

Wherein, the prompt information output system based on LBS further comprises: a specified geographic location acquiring unit configured to determine the specified geographic location; and a setting unit configured to set the preset time range and/or preset distance value corresponding to the specified geographic location, and setting the prompt information corresponding to the specified geographic location. According to one embodiment of the disclosure, the specified geographic location acquiring unit and the setting unit are triggered before the determining unit 42 is triggered.

In the embodiment of the disclosure, the prompt information includes service information related to the specified geographic location. When the user needs to acquire the service information around a certain geographic location, for example, market's promotion activity, bus station information, medical service information, etc. in order to prevent the user from missing the service information, service information around the certain geographic location may be defined as the prompt information, and of course any information customized by the user may also be defined as the prompt information, so that the user may acquire more service information when the user is near the geographic location or when a certain time arrives.

In the embodiment of the disclosure, the preset distance value is the space radius around a specified geographic location. A certain specified geographic location concerned by the user is determined firstly. The specified geographic location may be acquired according to the latitude and longitude information preset by the user. The preset time range corresponding to the specified geographic location may then be defined, as shown in FIG. 3, the preset time range may be defined as 7:55 AM, SAT, March 19 to 8:00 AM, SAT, March 19, so that when the current time falls within the preset time range, that is, when the preset condition is met, the preset prompt information is pushed. Or a space radius around the specified geographic location, such as 40 m, may be simultaneously or separately defined so that when the value of distance between the current geographic location and the specified geographic location is less than or equal to the preset 40 m, the preset prompt information is pushed. And the preset prompt information may be "the nearby bus route is line 3" as shown in FIG. 3 and it may display the market information nearby, such as the address and telephone of a shopping mall.

The determining unit 42 is configured to determine whether the current time falls within a preset time range, and/or whether a value of distance between the current geographic location and a preset specified geographic location is less than or equal to (that is, not greater than) a preset distance value.

The prompt output unit 43 is configured to output the preset prompt information when the output result of the determining unit 42 is "positive", wherein the prompt information includes the service information related to the specified geographic location.

The trigger unit 44 is configured to trigger the current time and location acquiring unit 41 when the output result of the determining unit 42 is "negative".

In the embodiment of the disclosure, after setting the space radius and acquiring the current geographic location, and/or after setting the time range and space radius and acquiring the current time and geographic location, the method may be configured to determine whether the current time falls within the preset time range, and/or determine whether the distance between the current geographic location and the preset specified geographic location is less than or equal to the preset distance value using the determining unit 42, wherein the preset distance value is the space radius around the specified geographic location. If the output result of the determining unit 42 is "positive", then the prompt output unit 43 outputs the preset prompt information, wherein the prompt information includes the service information related to the specified geographic location. If the output result of the determining unit 42 is "negative", the preset prompt information is not output and the current time and location acquiring unit 41 is continuously triggered to acquire the current time and/or current geographic location in order to determine in real time and output the related prompt information timely.

Further, when the results of determination are "positive", besides the preset prompt information is sent to the user's own client side, it may also be sent to the user's friends' client side via Instant Messaging (IM) such as short message and QQ message to enlarge the number of people receiving the prompt information. Moreover, an error value may be defined when a distance value between the current geographic location and the preset specified geographic location is acquired. The absolute value of a difference between the distance value and the error value is acquired. When the determination of whether the absolute value is not greater than a preset distance value is "positive", the preset prompt information is output. Using this method, the errors existing in acquiring the current geographic location may be avoided and the accuracy of the determination result may be assured.

In the embodiment of the disclosure, outputting service information concerned by the user and related to a certain geographic location timely is achieved by the prompt information output system based on LBS comprising a current time and location acquiring unit, a determining unit, a prompt output unit and a trigger unit, so that the user may acquire the service information related to the geographic location timely and the user experience is also improved.

The embodiment of the disclosure provides a prompt information output method based on LBS. The method solves the problem that the service information concerned by the user and related to a certain geographic location can not be output in a timely manner so that the user can't acquire the service information related to the geographic location in time and the user experience is poor, by acquiring the current time and/or the current geographic location in real time, determining whether the current time and/or the current geographic location meet the preset conditions, and outputting a preset prompt information to client side or other user's clients side when one or more of the preset conditions are met, therefore the user may acquire the service information related to the specified geographic location timely and effectively and thus improve the user experience.

A person skilled in the art will appreciate that numerous variations and/or modifications may be made to the present disclosure as disclosed by the specific embodiments without departing from the spirit or scope of the disclosure as defined in the appended claims. The embodiments are therefore to be considered in all respects to be illustrative and not restrictive.

The invention claimed is:

1. A method of outputting prompt information by a server for a mobile terminal based on location based services (LBS), the method comprising:
    acquiring by the server a current time and a current geographic location for the mobile terminal;
    determining by the server whether the current time falls within a preset time range, and whether a value of distance between the current geographic location and a preset specified geographic location is less than or equal to a preset distance value,
    outputting a preset prompt information when the current time falls within the preset time range, or when the value of distance between the current geographic location and the preset specified geographic location is less than or equal to the preset distance value, or when the current time falls within the preset time range and the value of distance between the current geographic location and the preset specified geographic location is less than or equal to the preset distance value, wherein the prompt information includes service information related to the specified geographic location, wherein the preset prompt information is communicated to mobile terminal by the server.

2. The method of claim 1 further comprising: not outputting the preset prompt information when the current time is not within the preset time range, or when the value of distance between the current geographic location and the preset specified geographic location is greater than the preset distance value, or when the current time is not within the preset time range and the value of distance between the current geographic location and the preset specified geographic location is greater than the preset distance value.

3. The method of claim 1 further comprising: determining a specified geographic location; and
    setting the preset time range and/or the preset distance value corresponding to the specified geographic location, while setting the prompt information corresponding to the specified geographic location.

4. The method of claim 1, wherein the preset distance value is the space radius around the specified geographic location.

5. The method of claim 1, wherein acquiring the current geographic location comprising:
    acquiring multiple location information corresponding to the current geographic location by using multiple positioning systems;
    acquiring the location information of the current geographic location by making weighted summation of the multiple location information according to the preset weights of each positioning system; and
    determining the current geographic location according to the location information.

6. The method of claim 5, wherein the location information includes latitude and longitude information.

7. A system for outputting prompt information based on LBS, the system comprising:
    a current time and location acquiring unit configured to acquire the current time and the current geographic location;
    a determining unit configured to determine whether the current time falls within a preset time range, and whether a value of distance between the current geographic location and a preset specified geographic location is less than or equal to a preset distance value; and
    a prompt output unit configured to output a preset prompt information when the determining unit determines that the current time falls within the preset time range, or the value of distance between the current geographic location and the preset specified geographic location is less than or equal to the preset distance value, or the current time falls within the preset time range and the value of distance between the current geographic location and the preset specified geographic location is less than or equal to the preset distance value, the prompt information includes service information related to the specified geographic location.

8. The system of claim 7, further comprising:
    a trigger unit configured to trigger the current time and location acquiring unit when the current time is not within the preset time range, or the value of distance between the current geographic location and the preset specified geographic location is greater than the preset distance value, or the current time is not within the preset time range and the value of distance between the current geographic location and the preset specified geographic location is greater than the preset distance value.

9. The system of claim 7, further comprising:
    a specified geographic location acquiring unit configured to determine the specified geographic location; and
    a setting unit configured to set the preset time range and/or the preset distance value corresponding to the specified geographic location, while set the prompt information corresponding to the specified geographic location.

10. The system of claim 7, wherein the preset distance value is the space radius around the specified geographic location.

11. The system of claim 7, wherein the current time and location acquiring unit comprising:
    a time acquiring unit configured to acquire the current time;
    a first location information acquiring unit configured to acquire multiple location information corresponding to the current geographic location by using multiple positioning systems;
    a second location information acquiring unit configured to acquire the location information of the current geographic location by making weighted summation of the multiple location information according to the preset weights of each positioning system, and
    a geographic location acquiring unit configured to determine the current geographic location according to the location information.

12. The system according to claim 11, wherein the location information includes latitude and longitude information.

13. A non-transitory storage medium stored therein a set of processor-executable instructions, which when processed by the processor, cause the processor to execute the steps of:
- acquiring current time and/or a current geographic location;
- determining whether the current time falls within a preset time range, and whether a value of distance between the current geographic location and a preset specified geographic location is less than or equal to a preset distance value; and
- outputting a preset prompt information when the current time falls within the preset time range, or when the value of distance between the current geographic location and the preset specified geographic location is less than or equal to the preset distance value, or when the current time falls within the preset time range and the value of distance between the current geographic location and the preset specified geographic location is less than or equal to the preset distance value, the prompt information includes service information related to the specified geographic location.

14. The non-transitory storage medium of claim 13, wherein the processor-executable instructions stored in the storage medium further cause the processor to execute the following steps:
- not outputting the preset prompt information, and returning to the step of acquiring the current time and/or the current geographic location, when the current time is not within the preset time range, or when the value of distance between the current geographic location and the preset specified geographic location is greater than a preset distance value, or when the current time is not within the preset time range and the value of distance between the current geographic location and the preset specified geographic location is greater than the preset distance value.

15. The non-transitory storage medium of claim 13, wherein before executing the step of determining whether the current time falls within the preset time range and/or whether the value of distance between the current geographic location and the preset specified geographic location is less than or equal to the preset distance value, the processor-executable instructions stored in the storage medium further cause the processor to execute the following steps:
- determining a specified geographic location; and
- setting the preset time range and/or the preset distance value corresponding to the specified geographic location, and setting the prompt information corresponding to the specified geographic location.

16. The non-transitory storage medium of claim 13, wherein the preset distance value is the space radius around the specified geographic location.

17. The non-transitory storage medium of claim 13, wherein the processor-executable instructions stored in the storage medium further cause the processor to execute the following steps:
- acquiring multiple location information corresponding to the current geographic location by using multiple positioning systems;
- acquiring the location information of the current geographic location by making weighted summation of the multiple location information according to the preset weights of each positioning system; and
- determining the current geographic location according to the location information.

18. The non-transitory storage medium of claim 17, wherein the location information includes latitude and longitude information.

* * * * *